United States Patent [19]

Mori et al.

[11] Patent Number: 4,715,976

[45] Date of Patent: Dec. 29, 1987

[54] ELECTROLYTE SOLUTION FOR ELECTROLYTIC CAPACITOR

[75] Inventors: Shoichiro Mori; Makoto Ue, both of Ibaraki, Japan

[73] Assignee: Mitsubishi Petrochemical Co., Ltd., Tokyo, Japan

[21] Appl. No.: 943,728

[22] Filed: Dec. 19, 1986

[30] Foreign Application Priority Data

Dec. 20, 1985 [JP] Japan .................. 60-286980
Dec. 20, 1985 [JP] Japan .................. 60-286982
Apr. 28, 1986 [JP] Japan .................. 61-98673

[51] Int. Cl.$^4$ ............................. H01G 9/02
[52] U.S. Cl. .................. 252/62.2; 260/501.1; 260/501.15
[58] Field of Search ....................... 252/62.2

[56] References Cited

U.S. PATENT DOCUMENTS

| | | | |
|---|---|---|---|
| 3,118,939 | 1/1964 | Finkelstein et al. | 252/62.2 |
| 3,223,639 | 12/1965 | Powers et al. | 252/62.2 |
| 3,300,693 | 1/1967 | Ross et al. | 252/62.2 |
| 3,403,304 | 9/1968 | Ross et al. | 252/62.2 |
| 3,567,518 | 3/1971 | Smyth et al. | 252/62.2 |
| 3,812,039 | 5/1974 | Niwa | 252/62.2 |
| 4,376,569 | 3/1983 | Barltrop et al. | 252/62.2 |
| 4,377,692 | 3/1983 | Barry et al. | 252/62.2 |
| 4,399,489 | 8/1983 | Ross | 252/62.2 |
| 4,408,258 | 10/1983 | Dapo | 252/62.2 |

Primary Examiner—Arthur P. Demers
Attorney, Agent, or Firm—Oblon, Fisher, Spivak, McClelland & Maier

[57] ABSTRACT

An electrolyte solution for use in an electrolytic capacitor. The solution comprises as a solute at least one quaternary ammonium salt of a carboxylic acid selected from the group consisting of (a) quaternary ammonium salts of maleic acid and/or citraconic acid,
(b) quaternary ammonium salts of aromatic carboxylic acids, and
(c) quaternary ammonium salts of branched-chain aliphatic dicarboxylic acids having 11 to 30 carbon atoms in total. This electrolyte solution has high electric conductivity.

9 Claims, 1 Drawing Figure

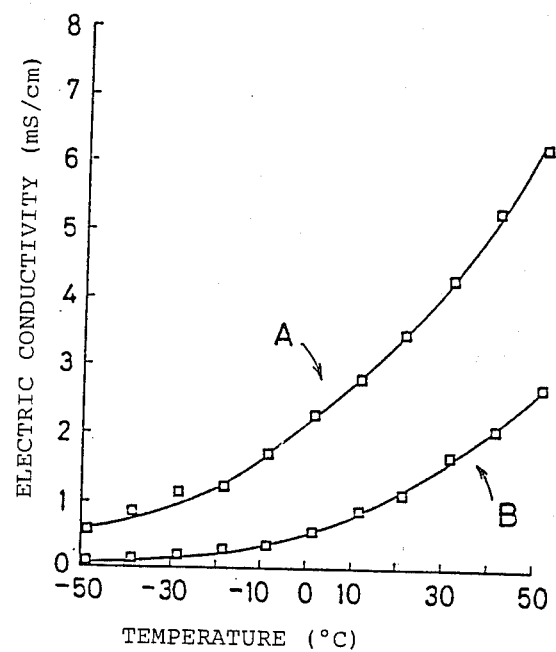

ELECTROLYTE SOLUTION FOR ELECTROLYTIC CAPACITOR

FIELD OF THE INVENTION

The present invention relates to an electrolyte solution for an electrolytic capacitor, and more particularly to an electrolyte solution which has high electric conductivity.

BACKGROUND OF THE INVENTION

The chemical or electric properties of an electrolyte solution such as electric conductivity and sparking voltage become main factors which determine the properties of the electrolytic capacitors.

A solution of an amine salt of maleic acid or phthalic acid in an aprotic organic polar solvent such as N,N-dimethylformamide or gamma-butyrolactone is used for low voltage electrolytic capacitors which have good low temperature characteristics.

However, as the impedance of electrolytic capacitors has become lower, electrolyte solutions having higher electric conductivity have been desired.

A solution of boric acid or ammonium borate in an ethylene glycol solvent has been used as an electrolyte solution for medium to high voltages because it has a high sparking voltage. As is well known, this electrolyte solution contains large amounts of water formed during esterification of ethylene glycol and boric acid, and large amounts of water vapor formed at temperature exceeding 100° C. causes distortion in the appearance of the armoring case and deteriorates the electric properties of the electrolytic capacitors. For this reason, it is impossible to use this electrolyte solution at temperature over 100° C.

To overcome this disadvantage, it was proposed to use an ammonium salt of a branched-chain aliphatic dicarboxylic acid where the water content becomes extremely small [Japanese Laid-Open Patent Application No. 45014/81 and Japanese Laid-Open Patent Application No. 27013/82 (corresponding to U.S. Pat. 4,469,610)].

However, the above electrolyte solutions using a solvent composed mainly of ethylene glycol have a poor electric conductivity at low temperature.

It may be possible to use an aprotic solvent such as N,N-dimethylformamide or gamma-butyrolactone having a broader freezing point-boiling point range than ethylene glycol together with the aforesaid ammonium salt of a branched-chain aliphatic dicarboxylic acid in order to improve the low temperature characteristics, but very little of these ammonium salts solve into such solvents.

Japanese Laid-Open Patent Application No. 78522/84 (corresponding to U.S. Pat. No. 4,473,864) discloses an electrolyte solution having high electric conductivity composed of a solution of a quaternary ammonium salt of a dibasic carboxylic acid HOOC—$(CH_2)_n$COOH ($4 \leq n \leq 8$) in amide solvents with 2 to 10% by weight of water. This electrolyte solution, however, is not fully satisfactory in electric conductivity, sparking voltage, and temperature range.

SUMMARY OF THE INVENTION

The present inventors have made extensive investigations in order to find out a novel electrolyte solution having a higher electric conductivity, and have consequently found that quaternary ammonium salts of maleic acid and/or citraconic acid having an unsaturated double bond and high acidity show at least twice as high electric conductivity as the quaternary ammonium salts of adipic acid, etc.; that quaternary ammonium salts of aromatic carboxylic acids also show higher electric conductivity than the quaternary ammonium salt of adipic acid; and that for use in a medium to high voltage electrolyte solution, quaternary ammonium salts of branched-chain aliphatic dicarboxylic acids having 11 to 30 carbon atoms in total show high solubility in aprotic solvents and show relatively high electric conductivity.

According to this invention, there is provided an electrolyte solution for use in an electrolytic capacitor, said solution comprising as a solute at least one quaternary ammonium salt of a carboxylic acid selected from the group consisting of:
(a) quaternary ammonium salts of maleic acid and/or citraconic acid,
(b) quaternary ammonium salts of aromatic carboxylic acids, and
(c) quaternary ammonium salts of branched-chain aliphatic dicarboxylic acids having 11 to 30 carbon atoms in total.

BRIEF DESCRIPTION OF THE DRAWING

In drawing, A represents the changes of the electric conductivity of the electrolyte solution obtained in Example 28 with temperature, and B shows the changes of the electric conductivity of the electrolyte solution obtained in Comparative Example 10 with temperature.

DETAILED DESCRIPTION OF THE INVENTION

The quaternary ammonium salts of maleic acid, and/or citraconic acid, aromatic carboxylic acids, and branched-chain aliphatic dicarboxylic acids having 11 to 30 carbon atoms in total used as solutes in this invention show good solubility in solvent and high electric conductivity, and when used together with solvents having a broad freezing point-boiling point range, constitute excellent electrolyte solutions for use in electrolytic capacitor having a wide range of service temperatures.

Examples of the quaterary ammonium salts in the quaternary ammonium salts of maleic acid acid and/or citraconic acid, aromatic acids, and branched-chain aliphatic dicarboxylic acids having 11 to 30 carbon atoms in total used in this invention include aliphatic quaternary ammonium salts such as tetraethylammonium, tetrapropylammonium, tetrabutylammonium, methyltriethylammonium, methyltripropylammonium, methyltributylammonium, dimethyldiethylammonium, dimethyldipropylammonium, dimethyldibutylammonium, ethyltripropylammonium, ethyltributylammonium, diethyldipropylammonium, diethyldibutylammonium, triethylpropylammonium, triethylbutylammonium, etc.; alicyclic quaternary ammonium salts such as N,N-dimethylpyrrolidinium, N,N-dimethylpiperidinium, N-methyl-N-ethylpyrrolidinium, N-methyl-N-ethylpiperidinium, N,N-diethylpyrrolidinium, N,N-diethylpiperidinium, N,N-tetramethylenepyrrolidinium, N,N-pentamethylenepiperidinium, etc.; and aromatic quaternary ammonium such as N-ethylpyridinium, N,N'-dimethylimidazolium, etc.

The aromatic carboxylic acids in the quaternary ammonium salts of aromatic carboxylic acids used in this invention are compounds represented by the following formula (I):

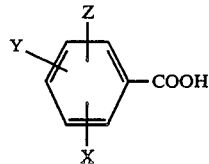

wherein X, Y and Z are identical or different and each represents a hydrogen atom or an alkyl, hydroxyl, alkoxy, amino, monoalkylamino, dialkylamino, nitro or carboxyl group.

The aromatic carboxylic acids have 7 to 30 carbon atoms, preferably 7 to 12 carbon atoms, in total.

Specific examples include aromatic monocarboxylic acids (including o-, m- and p-isomers) such as benzoic acid, toluic acid, ethylbenzoic acid, propylbenzoic acid, isopropylbenzoic acid, butylbenzoic acid, isobutylbenzoic acid, sec-butylbenzoic acid, tert-butylbenzoic acid, hydroxybenzoic acid, anisic acid, ethoxybenzoic acid, propoxybenzoic acid, isopropoxybenzoic acid, butoxybenzoic acid, isobutoxybenzoic acid, secbutoxybenzoic acid, tert-butoxybenzoic acid, aminobenzoic acid, N-methylaminobenzoic acid, N-ethylaminobenzoic acid, N-propylaminobenzoic acid, N-isopropylaminobenzoic acid, N-butylaminobenzoic acid, N-isobutylaminobenzoic acid, N-sec-butylaminobenzoic acid, N-tertbutylaminobenzoic acid, N,N-dimethylaminobenzoic acid, N,N-diethylaminobenzoic acid, nitrobenzoic acid and resorcylic acid; and aromatic polycarboxylic acids such as phthalic acid, isophthalic acid, terephthalic acid, nitrophthalic acid, trimellitic acid, hemimellitic acid, trimesic acid and pyromellitic acid.

In the quaternary ammonium salts of branched-chain aliphatic dicarboxylic acids having 11 to 30 carbon atoms in total used in this invention, specific examples of the branched-chain aliphatic dicarboxylic acids having 11 to 30 carbon atoms include 1,5-octanedicarboxylic acid, 1,6-decanedicarboxylic acid, 5,6decanedicarboxylic acid, 1,7-decanedicarboxylic acid, 4,6-dimethyl-4-nonene-1,2-dicarboxylic acid, 4,6-dimethyl-1,2-nonanedicarboxylic acid, 1,7-dodecanedicarboxylic acid, 5-ethyl-1,1,0-decanedicarboxylic acid, 6-methyl-6-dodecene-1,12-dicarboxylic acid, 6-methyl-1,12-dodecanedicarboxylic acid, 6-ethylene-1,12-dodecanedicarboxylic acid, 6-ethyl-1,12-dodecanedicarboxylic acid, 7-methyl-7-tetradecene-1,14-dicarboxylic acid, 7-methyl-1,14-tetradecanedicarboxylic acid, 3-hexyl-4-decene-1,2dicarboxylic acid, 3-hexyl-1,2-decanedicarboxylic acid, 6-ethylene-9-hexadecene-1,16-dicarboxylic acid, 6-ethyl-1,16-hexadecanedicarboxylic acid, 6-phenyl-1,12-dodecanedicarboxylic acid, 7,12-dimethyl-7,11-octadecadiene-1,18dicarboxylic acid, 7,12-dimethyl-1,18-octadecanedicarboxylic acid and 6,8-diphenyl-1,14-tetradecanedicarboxylic acid.

Solvents which are used to dissolve the quaternary ammonium salts of maleic acid and/or citraconic acid, the quaternary ammonium salts of the aromatic carboxylic acids and the quaternary ammonium salts of branched-chain aliphatic dicarboxylic acids having 11 to 30 carbon atoms in total include amides such as N-methylformamide, N-ethylformamide, N,N-dimethylformamide, N,N-diethylformamide, N-methylacetamide, N-ethylacetamide, N,N-dimethylacetamide, N,N-diethylacetamide and N-methylpyrrolidinone, lactones such as beta-butyrolactone, gamma-butyrolactone, gamma-valerolactone and delta-valerolactone, carbonates such as ethylene carbonate, propylene carbonate and butylene carbonate, alcohols such as ethylene glycol, glycerin and methyl cellosolve, sulfolanes such as sulfolane and 3-methylsulfolane, nitriles such as 3-methoxypropionitrile, and phosphates such as trimethyl phosphate.

These solvents may be used singly or in combination.

Among these, solvents composed mainly of aprotic solvents such as amides and lactones are preferred, and partioularly solvents composed mainly of gammabutyrolactone are preferred by the following reasons. Gamma-butyrolactone has a broad freezing point-boiling point range and is less toxic. Gamma-butyrolactone also does not attack the sealing gaskets compared with amide solvents, and electrolyticcapacitor using this solvent is hardly suffered serious damage from halogen ion generated from the washing agent for solder flux which will be transmitted through a closure.

The amount of the quaternary ammonium salt dissolved in the solvent is below the saturation concentration, preferably 5 to 40% by weight based on the total weight of the electrolyte solution when the quaternary ammonium salt is the quaternary ammonium salt of maleic acid, and/or citraconic acid or the aromatic carboxylic acid. In the case of the quaternary ammonium salt of a branched-chain aliphatic carboxylic acid having 11 to 30 carbon atoms in total, its concentration in the solvent is 1 to 40% by weight based on the total weight of the electrolyte solution, and the sparking voltage of the resulting solution can be made higher as the concentration is lower.

The equivalent ratio of the acid to the base in the salt dissolved in the electrolyte solution is usually from 1/1 to 4/1. The mole ratio of the acid to the base is from 1/1 to 4/1 for monocarboxylic acids, from 0.5/1 to 2/1 for dicarboxylic acids, from 0.33/1 to 1.33/1 for tricarboxylic acids, and from 0.25/1 to 1/1 for tetracarboxylic acids. For example, the quaternary ammonium salt of maleic acid or phthalic acid requires 0.5 to 2 moles of the acid per mole of quaternary ammonium, but the most preferred eleotric conductivity can be obtained when 1 mole of the acid is used for 1 mole of quaternary ammonium. The quaternary ammonium salt of benzoic acid requires 1 to 4 moles of the acid per mole of quaternary ammonium, but the most preferred electric conductivity is obtained when 1 mole of the acid is used for 1 mole of quaternary ammonium.

The quaternary ammonium salt of a carboxylic acid in accordance with this invention can be obtained, for example, by neutralizing the carboxylic acid with an aqueous solution of a quaternary ammonium hydroxide, evaporating water under reduced pressure, recrystallizing the resulting product from methanol or acetone, and drying the product in vacuum.

The electrolyte solution of this invention can also be prepared by adding the carboxylic acid and an aqueous solution of quaternary ammonium hydroxide to the solvent, and dehydrating the resulting solution.

The electrolyte solution comprises at least one of quaternary ammonium salts of maleic acid and/or citraconic acid, quaternary ammonium salts of aromatic carboxylic acid and quaternary ammonium salts of branched-chain aliphatic carboxylic acids having 11 to 30 carbon atoms in total and the solvent. But to prevent electrolytic corrosion, reduce leakage current, and absorb hydrogen gas, various auxiliary solutes such as phosphoric acid derivatives and nitrobenzene derivatives may be added. Furthermore, boric acid derivatives, for example, may be added to increase sparking voltage of medium to high voltage electrolyte solutions.

The following Examples and Comparative Examples illustrate the present invention more specifically. However, the present invention should not be construed as in any way being limited to the following Examples and Comparative Examples.

The abbreviations used in tables appearing hereinafter have the following meanings.

GBL: Gamma-butyrolactone
DMF: N,N-Dimethylformamide
MPN: 3-Methoxypropionitrile
TMP: Trimethyl phosphate
PC: Propylene carbonate
EG: Ethylene glycol

EXAMPLE 1

Monotetraethylammonium maleate was dissolved in a concentration of 20% by weight in gamma-butyrolactone as a solvent to form an electrolyte solution. The electrolyte solution had an electric conductivity of 13.7 mS/cm at 25° C. which was more than twice that of the electrolyte solution containing an amine salt (obtained in Comparative Example 1) or the electrolyte solution containing an adipic acid salt (obtained in Comparative Example 4). When a constant current of 2 mA/cm$^2$ was applied to on set of plus and minus smooth aluminum foils in the electrolyte solution, the voltage at which spark was generated was 83 V.

EXAMPLES 2 TO 6

Example 1 was repeated except that N,N-dimethylformamide (Example 2), propylene carbonate (Example 3), a mixture of gamma-butyrolactone and ethylene glycol (80:20 by weight percent) (Example 4), 3-methoxypropionitrile (Example 5), or trimethyl phosphate (Example 6) was used respectively instead of the gamma-butyrolactone. The electric conductivity and sparking voltage of the electrolyte solution were measured, and the results are shown in Table 1.

EXAMPLES 7 TO 10

Example 1 was repeated except that monotetrapropylammonium maleate (Example 7), monotetrabutylammonium maleate (Example 8), mono-N-methyl-N-ethylpyrrolidinium maleate (Example 9), or ditetraethylammonium maleate (Example 10) was used instead of monotetraethylammonium maleate. The electric conductivity and sparking voltage of the electrolyte solution were measured, and the results are shown in Table 1.

EXAMPLE 11

Example 1 was repeated except that monotetraethylammonium citraconate was used instead of monotetraethylammonium maleate. The resulting electrolyte solution had an electric conductivity of 11.8 mS/cm, and a sparking voltage of 86 V.

COMPARATIVE EXAMPLES 1 TO 3

Monotriethylammonium maleate was dissolved in a concentration of 20% by weight in gamma-butyrolactone (Comparative Example 1), N,N-dimethylformamide (Comparative Example 2) or propylene carbonate (Comparative Example 3) as a solvent to form an electrolyte solution. The electric conductivity of the electrolyte solution was measured, and the results are shown in Table 2.

It is seen that in any of these solvents, the quaternary ammonium salts used in this invention show much higher electric conductivity.

TABLE 1

| Example | Solvent | Solute (20% by weight) | Electric Conductivity, 25° C. (mS/cm) | Sparking Voltage (V) |
| --- | --- | --- | --- | --- |
| 1 | GBL | Monotetraethylammonium maleate | 13.7 | 83 |
| 2 | DMF | Monotetraethylammonium maleate | 20.5 | 80 |
| 3 | PC | Monotetraethylammonium maleate | 10.0 | 76 |
| 4 | GBL/EG (80/20) | Monotetraethylammonium maleate | 8.1 | 75 |
| 5 | MPN | Monotetraethylammonium maleate | 14.0 | 67 |
| 6 | TMP | Monotetraethylammonium maleate | 8.8 | 172 |
| 7 | GBL | Monotetrapropylammonium maleate | 9.5 | — |
| 8 | GBL | Monotetrabutylammonium maleate | 7.3 | 76 |
| 9 | GBL | Mono-N—methyl-N—ethylpyrrolidinium maleate | 10.9 | 90 |
| 10 | GBL | Ditetraethylammonium maleate | 7.8 | 78 |
| 11 | GBL | Monotetraethylammonium citraconate | 11.8 | 86 |

TABLE 2

| Comparative Example | Solvent | Solute (20% by weight) | Electric Conductivity (25° C.) (mS/cm) |
| --- | --- | --- | --- |
| 1 | GBL | Monotriethylammonium maleate | 4.2 |
| 2 | DMF | Monotriethylammonium maleate | 12.8 |
| 3 | PC | Monotriethylammonium maleate | 3.4 |

EXAMPLE 12

Tetraethylammonium benzoate was dissolved in a concentration of 20% by weight in gamma-butyrolactone as a solvent to form an electrolyte solution. The electrolyte solution had an electric conductivity of 8.4 mS/cm at 25° C., and a sparking voltage of 133 V when a constant current of 2 mA/cm was applied to one set of plus and minus smooth aluminum foils in the electrolyte solution.

EXAMPLES 13 TO 15

Example 12 was repeated except that monotetraethylammonium phthalate (Example 13), monotetraethylammonium trimellitate (Example 14), or ditetraethylammonium pyromellitate (Example 15) was used instead of the tetraethylammonium benzoate. The electric conductivity and the sparking voltage of the electrolyte solution were measured, and the results are shown in Table 3.

EXAMPLES 16 TO 18

Example 12 wa repeated except that N,N-dimethylformamide (Example 16), 3-methoxypropionitrile (Example 17) or trimethyl phosphate (Example 18) was used instead of gamma-butyrolactone. The electric conductivity of the electrolyte solution was measured, and the results are shown in Table 3.

COMPARATIVE EXAMPLE 4

Example 1 was repeated except that monotetraethylammonium adipate was used instead of the monotetraethylammonium maleate. The electric conductivity and sparking voltage of the electrolyte solution were measured, and the results are shown in Table 4.

COMPARATIVE EXAMPLES 5 TO 8

Monotetraethylammonium adipate was dissolved in a concentration of 20% by weight in N,N-dimethylformamide (Comparative Example 5), 3-methoxypropionitrile (Comparative Example 6), trimethyl phosphate (Comparative Example 7) or propylene carbonate (Comparative Example 8) as a solvent. The electric conductivity and sparking voltage of the electrolyte solution were measured, and the results are shown in Table 4.

COMPARATIVE EXAMPLE 9

Example 12 was repeated except that triethylammonium benzoate wa used instead of the tetraethylammonium benzoate. The resulting electrolyte solution had a poor electric conductivity of 0.8 mS/cm.

EXAMPLES 19 TO 24

Example 12 was repeated except that tetraethylammonium salicylate (Example 19), tetraethylammonium p-nitrobenzoate (Example 20), tetraethylammonium o-nitrobenzoate (Example 21), tetraethylammonium o-toluate (Example 22), tetraethylammonium o-anisate (Example 23) or tetraethylammonium gamma-resorcylate (Example 24) was used instead of the tetraethylammonium benzoate. The electric conductivity of the resulting electrolyte solution was measured, and the results are shown in Table 5.

TABLE 3

| Example | Solvent | Solute (20% by weight) | Electric Conductivity (25° C.) (mS/cm) | Sparking Voltage (V) |
|---|---|---|---|---|
| 12 | GBL | Tetraethylammonium benzoate | 8.4 | 133 |
| 13 | GBL | Monotetraethylammonium phthalate | 10.1 | 90 |
| 14 | GBL | Monotetraethylammonium trimellitate | 5.9 | 105 |
| 15 | GBL | Ditetraethylammonium pyromellitate | 8.1 | 86 |
| 16 | DMF | Tetraethylammonium benzoate | 11.6 | — |
| 17 | MPN | Tetraethylammonium benzoate | 9.0 | — |
| 18 | TMP | Tetraethylammonium benzoate | 4.3 | — |

TABLE 4

| Comparative Example | Solvent | Solute (20% by weight) | Electric Conductivity (25° C.) (mS/cm) | Sparking Voltage (V) |
|---|---|---|---|---|
| 4 | GBL | Monotetraethylammonium adipate | 5.3 | 114 |
| 5 | DMF | Monotetraethylammonium adipate | 8.7 | — |
| 6 | MPN | Monotetraethylammonium adipate | 6.1 | 107 |
| 7 | TMP | Monotetraethylammonium adipate | 3.6 | 143 |
| 8 | PC | Monotetraethylammonium adipate | 4.8 | — |
| 9 | GBL | Triethylammonium benzoate | 0.8 | — |

TABLE 5

| Example | Solvent | Solute (20% by weight) | Electric Conductivity (25° C.) (mS/cm) |
|---|---|---|---|
| 19 | GBL | Tetraethylammonium salicylate | 10.1 |
| 20 | GBL | Tetraethylammonium p-nitrobenzoate | 7.5 |
| 21 | GBL | Tetraethylammonium o-nitrobenzoate | 7.3 |
| 22 | GBL | Tetraethylammonium o-toluate | 7.6 |
| 23 | GBL | Tetraethylammonium o-anisate | 6.1 |
| 24 | GBL | Tetraethylammonium gamma-resorcylate | 11.2 |

EXAMPLE 25

Monotetraethylammonium 6-ethyl-1,16-hexadecanedicarboxylate was dissolved in a concentration of 5% by weight in gamma-butyrolactone as a solvent to form an electrolyte solution. This electrolyte solution had an electric conductivity at 25° C. of 2.0 mS/cm and a sparking voltage of 355 V when a constant current of 4 mA/cm$^2$ was applied to one set of plus and minus smooth aluminum foils in the electrolyte solution.

EXAMPLES 26 TO 30

Example 25 was repeated except that the concentration of the solute was changed to 2% (Example 26), 10% (Example 27), 20% (Example 28), 30% (Example 29) or 40% (Example 30) by weight. The electric conductivity and sparking voltage of the electrolyte solution were measured, and the results are shown in Table 6.

EXAMPLE 31

Example 25 was repeated except that N,N-dimethylformamide was used instead of gamma-butyrolactone. The electric conductivity and the sparking voltage of the resulting electrolyte solution are shown in Table 6.

EXAMPLE 32

Monotetraethylammonium 3-hexyl-1,2-decanedicarboxylate was dissolved in a concentration of 20% by weight in gamma-butyrolactone as a solvent to form an electrolyte solution. Its electric conductivity and sparking voltage are shown in Table 6.

EXAMPLES 33 AND 34

Example 32 was repeated except that monotetraethylammonium 7,12-dimethyl-7,11-octadecadiene-1,18dicarboxylate (Example 33) or monotetraethylammonium 6,8-diphenyl-1,14-tetradecanedicarboxylate (Example 34) was used instead of the monotetraethylammonium 3-hexyl-1,2decanedicarboxylate. The electric conductivity and sparking voltage of the electrolyte solution are shown in Table 6.

COMPARATIVE EXAMPLE 10

Ammonium 6-ethyl-1,16-hexadecanedicarboxylate was dissolved in a concentration of 20% by weight in ethylene glycol as a solvent to form an electrolyte solution. The electric conductivity of the electrolyte solution is shown in Table 6.

COMPARATIVE EXAMPLE 11

Ammonium 6-ethyl-1,16-hexadecanedicarboxylate (5% by weight) was added to gamma-butyrolactone as a solvent, and the mixture was heated. The compound partly did not dissolve, and the resulting product was unsuitable for use as an electrolyte solution.

TABLE 6

|  | Solvent | Solute* | Electric Conductivity (25° C.) (mS/cm) | Sparking Voltage (V) |
|---|---|---|---|---|
| Example |  |  |  |  |
| 25 | GBL | Monotetraethylammonium 6-ethyl-1,16-hexadecanedicarboxylate (5) | 2.0 | 355 |
| 26 | GBL | Monotetraethylammonium 6-ethyl-1,16-hexadecanedicarboxylate (2) | 1.0 | 475 |
| 27 | GBL | Monotetraethylammonium 6-ethyl-1,16-hexadecanedicarboxylate (10) | 2.9 | 310 |
| 28 | GBL | Monotetraethylammonium 6-ethyl-1,16-hexadecanedicarboxylate (20) | 3.6 | 310 |
| 29 | GBL | Monotetraethylammonium 6-ethyl-1,16-hexadecanedicarboxylate (30) | 3.6 | 310 |
| 30 | GBL | Monotetraethylammonium 6-ethyl-1,16-hexadecanedicarboxylate (40) | 3.1 | 320 |
| 31 | DMF | Monotetraethylammonium 6-ethyl-1,16-hexadecanedicarboxylate (5) | 2.7 | 210 |
| 32 | GBL | Monotetraethylammonium 3-hexyl-1,2-decanedicarboxylate (20) | 4.6 | 220 |
| 33 | GBL | Monotetraethylammonium 7,12-dimethyl-7,11-octadecadiene-1,18-dicarboxylate (20) | 3.4 | 300 |
| 34 | GBL | Monotetraethylammonium 6,8-diphenyl-1,14-tetradecane-dicarboxylate (20) | 2.7 | — |
| Comparative Example |  |  |  |  |
| 10 | EG | Ammonium 6-ethyl-1,16-hexadecanedicarboxylate (20) | 1.2 | — |

*The parenthesized figures show the concentrations of the solutes in percent by weight.

EXAMPLE 35

Changes of the electric conductivities of the electrolyte solutions obtained in Example 28 and Comparative Example 10 with temperature were measured, and are shown in the Drawing. The electrolyte solution of this invention (Example 28) had much higher electric conductivity than the electrolyte solution of Comparative Example 10, and did not freeze even at −50° C.

While the invention has been described in detail and with reference to specific embodiments thereof, it will be apparent to one skilled in the art that various changes and modifications can be made therein without departing from the spirit and scope thereof.

What is claimed is:

1. An electrolyte solution for use in an electrolytic capacitor, said solution comprising as a solute at least one quaternary ammonium salt of a carboxylic acid selected from the group consisting of
   (a) quaternary ammonium salts of at least one of maleic acid and citraconic acid wherein the mole ratio of acid to ammonium is substantially 1/1,
   (b) quaternary ammonium salts of aromatic carboxylic acids, wherein the mole ratio of acid to ammonium is 1/1 to 4/1 for monocarboxylic acids, substantially 1/1 for dicarboxylic acids, 0.33/1 to 1.33/1 for tricarboxylic acids and 0.25/1 to 1/1 for tetracarboxylic acids, and
   (c) quaternary ammonium salts of branched-chain aliphatic dicarboxylic acids having 11 to 30 carbon atoms in total.

2. The electrolyte solution as claimed in claim 1, wherein a solvent composed mainly of aprotic solvent is used to dissolve the solute.

3. The electrolyte solution as claimed in claim 1, wherein at least one of (a) and (b) is used as the solute.

4. The electrolyte solution as claimed in claim 1, wherein at least one of (c) is used as the solute.

5. The electrolyte solution as claimed in claim 3, wherein a solvent composed mainly of gamma-butyrolactone is used to dissolve the solute.

6. The electrolyte solution as claimed in claim 4, wherein a solvent composed mainly of gamma-butyrolactone is used to dissolve the solute.

7. The electrolyte solution as claimed in claim 3, wherein the concentration of the solute is in the range of 5 to 40% by weight.

8. The electrolyte solution as claimed in claim 4, wherein the concentration of the solute is in the range of 1 to 40% by weight.

9. The electrolyte solution as claimed in claim 4, which is for use under medium to high voltages.

* * * * *